(12) United States Patent
Jones et al.

(10) Patent No.: US 7,617,447 B1
(45) Date of Patent: Nov. 10, 2009

(54) CONTEXT FREE DOCUMENT PORTIONS

(75) Inventors: Brian Jones, Redmond, WA (US);
Robert Little, Redmond, WA (US);
Marcin Sawicki, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 10/731,900

(22) Filed: Dec. 9, 2003

(51) Int. Cl.
G06F 17/00 (2006.01)
(52) U.S. Cl. ............ 715/234; 715/239; 715/248
(58) Field of Classification Search ......... 715/500, 715/511, 513, 515, 522, 523, 200, 209, 229, 715/234, 239, 248, 249
See application file for complete search history.

(56) References Cited

U.S. PATENT DOCUMENTS

| | | |
|---|---|---|
| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,267,155 A | 11/1993 | Buchanan et al. |
| 5,469,533 A | 11/1995 | Dennis |
| 5,487,138 A | 1/1996 | Rust et al. |
| 5,537,526 A | 7/1996 | Anderson et al. |
| 5,579,466 A | 11/1996 | Habib et al. |
| 5,579,519 A | 11/1996 | Pelletier |
| 5,613,124 A | 3/1997 | Atkinson et al. |
| 5,655,130 A | 8/1997 | Dodge et al. |
| 5,675,788 A | 10/1997 | Husick et al. |
| 5,701,342 A | 12/1997 | Anderson et al. |
| 5,745,910 A | 4/1998 | Piersol et al. |
| 5,752,055 A | 5/1998 | Redpath et al. |
| 5,752,056 A | 5/1998 | Celik |
| 5,819,295 A | 10/1998 | Nakagawa et al. |
| 5,845,058 A | 12/1998 | Shaw et al. |
| 5,893,109 A | 4/1999 | DeRose et al. |
| 5,903,903 A | 5/1999 | Kennedy |
| 5,903,905 A | 5/1999 | Andersen et al. ............ 815/526 |
| 5,905,504 A | 5/1999 | Barkans et al. |
| 5,911,776 A | 6/1999 | Guck |
| 5,950,215 A | 9/1999 | Tabuchi |

(Continued)

FOREIGN PATENT DOCUMENTS

EP    1 376 387 A2    1/2004

(Continued)

OTHER PUBLICATIONS

Heidi Steele, Easy Microsoft Office Word 2003, published Sep. 19, 2003 by Que Corporation, pp. 52, 53 and 216.*

(Continued)

*Primary Examiner*—Stephen S Hong
*Assistant Examiner*—Gregory J Vaughn
(74) *Attorney, Agent, or Firm*—Merchant & Gould P.C.

(57) ABSTRACT

Portions of an Extensible Markup Language document, such as individual paragraphs or groups of paragraphs or fragments of text, are provided self-describing properties such as styles, fonts, list types, and the like. If such a portion of a document is subsequently copied or moved to a second document or to a different location in the first document, the self-describing properties provided for the portion travel with the portion to the second document or to the different location in the first document.

17 Claims, 5 Drawing Sheets

U.S. PATENT DOCUMENTS

| | | |
|---|---|---|
| 5,960,168 A | 9/1999 | Shaw et al. |
| 5,993,088 A | 11/1999 | Nogay et al. |
| 6,023,714 A | 2/2000 | Hill et al. |
| 6,026,416 A | 2/2000 | Kanerva et al. |
| 6,067,531 A | 5/2000 | Hoyt et al. |
| 6,094,665 A | 7/2000 | Lyons et al. |
| 6,134,552 A | 10/2000 | Fritz et al. |
| 6,144,974 A | 11/2000 | Gartland |
| 6,182,080 B1 | 1/2001 | Clements |
| 6,182,096 B1 | 1/2001 | Mastie et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders et al. |
| 6,175,845 B1 | 10/2001 | Smith et al. |
| 6,342,904 B1 | 1/2002 | Vasudevan et al. |
| 6,362,870 B2 | 3/2002 | Mui et al. |
| 6,393,441 B1 | 5/2002 | Kanerva et al. |
| 6,407,821 B1 | 6/2002 | Hohensee et al. |
| 6,418,448 B1 | 7/2002 | Sarkar |
| 6,449,653 B2 | 9/2002 | Klemets et al. |
| 6,457,017 B2 | 9/2002 | Watkins et al. |
| 6,480,206 B2 | 11/2002 | Prinzing |
| 6,484,189 B1 | 11/2002 | Gerlach et al. |
| 6,496,206 B1 | 12/2002 | Mernyk et al. |
| 6,507,856 B1 | 1/2003 | Kanerva et al. |
| 6,509,974 B1 | 1/2003 | Hansen |
| 6,538,760 B1 | 3/2003 | deBry et al. |
| 6,549,918 B1 | 4/2003 | Probert, Jr. et al. |
| 6,583,789 B1 | 6/2003 | Carlson et al. |
| 6,591,278 B1 | 8/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,654,737 B1 | 11/2003 | Nunez |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,694,485 B1 | 2/2004 | Kelley et al. |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,785,673 B1 | 8/2004 | Fernandez |
| 6,789,229 B1 | 9/2004 | Dunietz et al. |
| 6,812,941 B1 | 11/2004 | Brown et al. |
| 6,871,321 B2 | 3/2005 | Wakayama |
| 6,910,843 B2 | 6/2005 | Saw et al. |
| 6,912,555 B2 | 6/2005 | Lemon et al. |
| 6,918,082 B1 | 7/2005 | Gross et al. |
| 6,925,597 B2 | 8/2005 | Anwar |
| 6,925,631 B2 | 8/2005 | Golden |
| 6,931,590 B2 | 8/2005 | Kanie et al. |
| 6,938,203 B1 | 8/2005 | Dimarco et al. |
| 6,941,510 B1 | 9/2005 | Ozzie et al. |
| 6,952,801 B2 | 10/2005 | Warmus et al. |
| 6,961,902 B2 | 11/2005 | Anecki et al. |
| 6,981,207 B1 | 12/2005 | Bakman et al. |
| 6,993,527 B1 | 1/2006 | Raman et al. |
| 7,036,076 B2 | 4/2006 | Anwar |
| 7,051,276 B1 | 5/2006 | Mogilevsky et al. |
| 7,054,841 B1 | 5/2006 | Tenorio |
| 7,080,083 B2 | 7/2006 | Kim et al. |
| 7,134,071 B2 | 11/2006 | Ohwada et al. |
| 7,168,035 B1 | 1/2007 | Bell et al. |
| 7,171,618 B2 | 1/2007 | Harrington et al. |
| 7,290,205 B2 | 10/2007 | Monocsko et al. |
| 7,301,544 B2 | 11/2007 | Yuan |
| 7,412,649 B2 | 8/2008 | Emek et al. |
| 7,418,652 B2 | 8/2008 | Ornstein et al. |
| 7,487,448 B2 | 2/2009 | Emerson et al. |
| 7,549,118 B2 | 6/2009 | Shur et al. |
| 2001/0003828 A1 | 6/2001 | Peterson et al. |
| 2001/0013043 A1 | 8/2001 | Wagner |
| 2001/0016842 A1 | 8/2001 | Umen et al. |
| 2001/0018697 A1 | 8/2001 | Kunitake et al. |
| 2001/0034739 A1 | 10/2001 | Anecki et al. |
| 2001/0039552 A1 | 11/2001 | Killi et al. |
| 2001/0044809 A1 | 11/2001 | Parasnis et al. |
| 2001/0044813 A1 | 11/2001 | Frank |
| 2001/0051962 A1 | 12/2001 | Piotkin |
| 2001/0054042 A1 | 12/2001 | Watkins et al. |
| 2002/0004805 A1 | 1/2002 | Nojima et al. |
| 2002/0016800 A1 | 2/2002 | Spivak et al. |
| 2002/0038348 A1 | 3/2002 | Malone et al. |
| 2002/0049790 A1 | 4/2002 | Ricker et al. |
| 2002/0059265 A1 | 5/2002 | Valorose |
| 2002/0059337 A1 | 5/2002 | Takaoka et al. |
| 2002/0065848 A1 | 5/2002 | Walker et al. |
| 2002/0065857 A1 | 5/2002 | Michalewicz |
| 2002/0073236 A1 | 6/2002 | Helgeson et al. |
| 2002/0087602 A1 | 7/2002 | Masuda et al. |
| 2002/0099797 A1 | 7/2002 | Merrell et al. |
| 2002/0103835 A1 | 8/2002 | Kearney |
| 2002/0107886 A1 | 8/2002 | Gentner et al. |
| 2002/0111133 A1 | 8/2002 | Wittkotter |
| 2002/0116421 A1 | 8/2002 | Fox et al. |
| 2002/0120647 A1* | 8/2002 | Amano .................... 707/501.1 |
| 2002/0129058 A1 | 9/2002 | Story et al. |
| 2002/0174145 A1 | 11/2002 | Duga et al. |
| 2002/0184263 A1 | 12/2002 | Perinet et al. |
| 2002/0188638 A1 | 12/2002 | Hamscher |
| 2002/0194220 A1 | 12/2002 | Sluiman |
| 2003/0004957 A1* | 1/2003 | Broman et al. .............. 707/100 |
| 2003/0023637 A1 | 1/2003 | Halahmi |
| 2003/0028560 A1 | 2/2003 | Kudrolli et al. |
| 2003/0033287 A1 | 2/2003 | Shanahan et al. |
| 2003/0065946 A1 | 4/2003 | Holliday et al. |
| 2003/0074633 A1 | 4/2003 | Boulmakoul et al. |
| 2003/0079181 A1 | 4/2003 | Schumacher et al. |
| 2003/0093520 A1 | 5/2003 | Beesley |
| 2003/0115547 A1 | 6/2003 | Ohwada et al. |
| 2003/0120671 A1 | 6/2003 | Kim et al. |
| 2003/0126136 A1 | 7/2003 | Omoigui |
| 2003/0126260 A1 | 7/2003 | Husain et al. |
| 2003/0137539 A1 | 7/2003 | Dees |
| 2003/0137691 A1 | 7/2003 | Tanaka ...................... 358/1.15 |
| 2003/0142128 A1 | 7/2003 | Reulein et al. |
| 2003/0145134 A1 | 7/2003 | Wehage et al. |
| 2003/0149934 A1* | 8/2003 | Worden ..................... 715/513 |
| 2003/0149935 A1* | 8/2003 | Takizawa et al. ........... 715/513 |
| 2003/0158851 A1 | 8/2003 | Britton et al. |
| 2003/0163552 A1 | 8/2003 | Savitzky et al. |
| 2003/0167446 A1* | 9/2003 | Thomas ..................... 715/513 |
| 2003/0172168 A1 | 9/2003 | Mak et al. |
| 2003/0172343 A1 | 9/2003 | Leymaster et al. |
| 2003/0177446 A1 | 9/2003 | Gropper et al. |
| 2003/0177449 A1* | 9/2003 | Rose ........................ 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1* | 11/2003 | Goldstein et al. ........... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0002937 A1 | 1/2004 | Jones et al. .................... 707/1 |
| 2004/0003343 A1 | 1/2004 | Liao et al. |

| | | |
|---|---|---|
| 2004/0003388 A1 | 1/2004 | Jacquemot et al. |
| 2004/0003389 A1 | 1/2004 | Reynar et al. .............. 717/178 |
| 2004/0015782 A1* | 1/2004 | Day et al. .................... 715/517 |
| 2004/0015890 A1 | 1/2004 | Wong et al. |
| 2004/0015908 A1 | 1/2004 | Giel et al. |
| 2004/0019853 A1* | 1/2004 | Takizawa et al. ............ 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054697 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1* | 5/2004 | Lee et al. .................... 707/200 |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1* | 9/2004 | Jones et al. .................. 715/500 |
| 2004/0172592 A1 | 9/2004 | Collie et al. |
| 2004/0181753 A1* | 9/2004 | Michaelides ................ 715/523 |
| 2004/0183837 A1 | 9/2004 | Watanabe et al. |
| 2004/0194025 A1 | 9/2004 | Hubert et al. |
| 2004/0205470 A1 | 10/2004 | Jones et al. .................. 715/500 |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0210818 A1 | 10/2004 | Jones et al. .................. 715/500 |
| 2004/0216048 A1 | 10/2004 | Brown et al. |
| 2004/0221233 A1 | 11/2004 | Thielen |
| 2004/0226012 A1 | 11/2004 | Awada et al. ............... 718/100 |
| 2004/0230894 A1 | 11/2004 | Elza et al. |
| 2004/0243551 A1 | 12/2004 | Boone et al. .................... 707/3 |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1* | 3/2005 | Aarts ......................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1* | 5/2005 | Karimisetty et al. ............ 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0149861 A1 | 7/2005 | Bishop et al. ............... 715/515 |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford ...................... 455/154.2 |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0069983 A1 | 3/2006 | Bailey et al. .............. 715/501.1 |
| 2006/0075337 A1 | 4/2006 | Jones et al. .................. 715/530 |
| 2006/0080314 A1 | 4/2006 | Hubert et al. |
| 2006/0080316 A1 | 4/2006 | Gilmore et al. |
| 2006/0080603 A1 | 4/2006 | Bailey et al. ................. 715/530 |
| 2006/0095834 A1 | 5/2006 | Jeon et al. |
| 2006/0117019 A1 | 6/2006 | Sylthe et al. |
| 2006/0136433 A1 | 6/2006 | Rothschiller et al. ......... 707/100 |
| 2006/0136477 A1 | 6/2006 | Bishop et al. ................ 707/102 |
| 2006/0136553 A1 | 6/2006 | Villaron et al. ............... 709/203 |
| 2006/0136809 A1 | 6/2006 | Fernstrom |
| 2006/0136812 A1 | 6/2006 | Jones et al. .................. 715/511 |
| 2006/0136816 A1 | 6/2006 | Jones et al. .................. 715/517 |
| 2006/0136827 A1 | 6/2006 | Villaron et al. ............... 715/730 |
| 2006/0155529 A1 | 7/2006 | Ludviksson et al. |
| 2006/0168562 A1 | 7/2006 | Emek et al. |
| 2006/0190815 A1 | 8/2006 | Jones et al. .................. 715/515 |
| 2006/0206794 A1 | 9/2006 | Ornstein et al. |
| 2006/0227150 A1 | 10/2006 | Yuan |
| 2006/0259854 A1 | 11/2006 | Walker et al. ............. 715/501.1 |
| 2006/0271574 A1 | 11/2006 | Villaron et al. ............... 707/100 |
| 2006/0277452 A1 | 12/2006 | Villaron et al. ............... 715/500 |
| 2007/0022128 A1 | 1/2007 | Rothschiller et al. ......... 707/100 |
| 2007/0061384 A1 | 3/2007 | Harrington et al. |
| 2007/0136443 A1 | 6/2007 | Sah et al. |
| 2007/0136662 A1 | 6/2007 | Khaba |

FOREIGN PATENT DOCUMENTS

| | | |
|---|---|---|
| EP | 1 452 966 | 11/2004 |
| EP | 1672543 | 11/2005 |
| EP | 1672528 | 12/2005 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/133053 | 12/2006 |
| ZA | 2005/09350 | 4/2008 |

OTHER PUBLICATIONS

U.S. Appl. No. 10/187,060, filed Jun. 28, 2002 entitled "Word Processing Document Stored in a Single XML File That May be Manipulated by Applications that Understanding XML."

U.S. Appl. No. 10/726,077, filed Dec. 2, 2003 entitled "Mixed Content Flexibility For XML Editors."

U.S. Appl. No. 10/184,190, filed Jun. 27, 2002 entitled "System and Method for Providing Namespace Related Information."

U.S. Appl. No. 10/185,940, filed Jun. 27, 2002 entitled "System and Method for Obtaining and Using Namespace Related Information for Opening XML Documents."

U.S. Appl. No. 10/164,260, filed Jun. 5, 2002 entitled "Mechanism for Downloading Software Components from a Remote Source for Use by a Local Software Application."

U.S. Appl. No. 11/019,088, filed Dec. 20, 2004, entitled "Management and Use of Data in a Computer-Generated Document".

U.S. Appl. No. 11/018,718, filed Dec. 20, 2004, entitled "File Formats, Methods, and Computer Program Products for Representing Documents".

U.S. Appl. No. 11/018,910, filed Dec. 20, 2004, entitled "File Formats, Methods, and Computer Program Products for Representing Presentations".

U.S. Appl. No. 11/018,912, filed Dec. 20, 2004, entitled "File Formats, Methods, and Computer Program Products for Representing Documents".

U.S. Appl. No. 11/125,907, filed May 11, 2005, entitled "Structuring an Electronic Document for Efficient Identification and Use of Document Parts,".

U.S. Appl. No. 11/018,405, filed Dec. 20, 2004, entitled "Context Free Document Portions With Alternate Formats,".

U.S. Appl. No. 10/726,077, filed Dec. 2003, Jones et al.

Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006, 607 pp.

Anonymous: "Technical note TN2073: Deconstructing A Keynote 1.x Document: Part One—Slides," Online Publication, May 20, 2003, XP002404031, Retrieved from the Internet: URL:http:///developer.apple.com/technotes/tn2002/pdf/tn2073.pdf on Oct. 20, 2006, 27 pp.

Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.

Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberryslideshow.zip on Oct. 20, 2006, 17 pp.

U.S. Official Action dated Mar. 7, 2007 in U.S. Appl. No. 11/018,912.

U.S. Official Action dated Jul. 26, 2007 in U.S. Appl. No. 11/018,569.

"@try inCSS3 (was: Useragent Rules in CSS)", http://lists.w3.org/Archives/Public/www-style/2004Mar/0333.html, 2 pages (Mar. 31, 2004).

"Apache Server Frequently Asked Questions", Apache HTTP Server Version 1.3, http://httpd.apache.org/docs/1.3/misc/FAQ.html; 43 pages.

"Controlling the Data Chaos by Adding Intelligence to Media", 4 pages (2004).

"Networked File System", http://www.scit.wlv.ac.uk/~jphb/comms/nfs.htm; 7 pages.

"Open eBook Publication Structure 1.2", http://www.idpf.org/oebps/oebps1.2/download/oeb12-html.htm. 71 pages (Aug. 27, 2002).

Bluethman et al., "Interleaved Graphics and Text", IBM Technical Disclosure Bulletin, vol. 22, No. 11, pp. 4813-4815 (Apr. 1980).

Chien et al., "Efficient Schemes for Managing Multiversion XML Documents", The VLDB Journal, vol. 11, pp. 332-353 (2002).

Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).

El-Kwae et al., "Document Image Representation Using XML Technologies", Proceedings of SPIE, vol. 4670, pp. 109-120 (2002).

Ellis, "Postscrip, Bezier Curves and Chinese Characters", ACM, pp. 162-165 (1989).

Girardot et al., "Efficient Representation and Streaming of XML Content Over the Internet Medium", IEEE, pp. 67-70 (2000).

Han et al., "WebSplitter: A Unified XML Framework for Multi-Device Collaborative Web Browsing", ACM, pp. 221-230 (2000).

Hardy et al., "Mapping and Displaying Stuctural Transformations Between XML and PDF", ACM 2002, pp. 95-102 (2002).

Holman, "What is XSL-FO", Google Mar. 20, 2002, http://www.xml.com/pub/a/2002/3/20/xsl-fo.html, 18 pages.

Jacobs et al., "Adaptive Grid-Based Document Layout", ACM Transactions on Graphics, vol. 22, No. 2, pp. 838-847 (Jul. 2003).

Marco et al.. "A Framework for Designing and Implementing the Ada Standard Container Library", ACM, pp. 49-61 (2003).

Meyer, O. "aTool—Creating Validated XML Documents on the Fly Using MS Word", pp. 113-121 (Oct. 2002).

Microsoft Word, (hereinafter Word), pp. 1-4 (Copyright 2001).

Miller, "An Introduction to the Resource Description Framework", D-Lib Magazine, ISSN 1082-9873, http://www.dlib.org/dlib/may98/miller/05miller.html, 10 pages (May 1998).

Obasanjo, "Designing Extensible, Versionable XML Formats", Google Jul. 21, 2004, http://www.xml.com/pub/a/2004/07/21/design.html, 17 pages.

Obasanjo, "Desiging XML Formats: Versioning vs. Extensibility", Google 2004, blogs.msdn.com/dareobasanjo/archive/2004/4/11/111369.aspx. One additional page is included to show the actual date of the article which is Nov. 17, 2004, 24 pages.

Obasanjo, Designing XML Formats: Versioning vs. Extensibility, Google Apr. 11, 2004, blogs.msdn.com/dareobasanjo/archive/2004/4/11/111369.aspx, 3 pages.

Office Action Correspondence Subsystem, version 1.3 (herein after OACS), copyright Feb. 2003, pp. 1-2 to 1-123, 2-2 to 2-122 and 3-2 to 3-44).

OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OO01.x.x/user_guide.pdf.

OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OOp1.x.x/user_guide.pdf.

Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.

Pawson, "Printing from XML: An Introduction to XSL-FO,", Google Oct. 9, 2002, http://www.xml.com/pub/a/2002/10/09/xslfo.html, 6 pages.

Peters et al., "CrystalWeb-A Distributed Authoring Environment for the World-Wide Web," Computer Networks and ISDN Systems, vol. 27, No. 6, pp. 861-870 (Apr. 1995).

Reply Assistant, pp. 1-34 (Copyright 2001).

Sahuguet et al., "Building Intelligent Web Applications Using Lightweight Wrappers", Data and Knowledge Engineering, vol. 36, pp. 283-316 (2001).

StarOffice 7 Office Suite, A Sun ONE Software Offering, Basic Programmer's Guide, pp. 1-10, 47, 91, 104 (Jul. 2003).

Unknown, ReplyAssistant Version 1.1, downloaded from <http://www.goldmedalsoft.com/shareware/Business_Finance-miscellaneous-ReplyAssistant-1.1.html>, Copyright 2000-2001, 7 figures, 5 pages ReadMet, 1 page About ReplyAssistant, 15 pages.

van Leeuwen et al., "XML for Flexibility and Extensibility of Design Information Models", Proceedings of CAADRIA, University of Sydney, Australia, pp. 491-502 (2001).

Whitmer, R., "Document Object Model (DOM) Level 3 Xpath Specification", W3C, http://www.w3.org/TR/DOM-Level-3-XPath/, Feb. 26, 2004, Version 1.0, 18 pages.

U.S. Official Action mailed Sep. 20, 2005 in U.S. Appl. No. 10/836,326.

U.S. Official Action mailed May 31, 2006 in U.S. Appl. No. 10/836,326.

U.S. Official Action mailed Oct. 20, 2006 in U.S. Appl. No. 10/836,326.

U.S. Official Action mailed Apr. 9, 2007 in U.S. Appl. No. 10/836,326.

U.S. Official Action mailed Jul. 26, 2007 in U.S. Appl. No. 10/836,326.

U.S. Official Action mailed Feb. 22, 2008 in U.S. Appl. No. 10/836,327.

U.S. Official Action mailed Jun. 28, 2006 in U.S. Appl. No. 10/836,608.

U.S. Official Action mailed Dec. 12, 2006 in U.S. Appl. No. 10/836,608.

U.S. Official Action mailed Mar. 8, 2007 in U.S. Appl. No. 10/836,608.

U.S. Official Action mailed Jul. 27, 2007 in U.S. Appl. No. 10/836,608.

U.S. Official Action mailed Jan. 24, 2005 in U.S. Appl. No. 10/837,040.

U.S. Official Action mailed Jul. 15, 2005 in U.S. Appl. No. 10/837,040.

U.S. Official Action mailed Oct. 18, 2005 in U.S. Appl. No. 10/837,040.

U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Jun. 14, 2007 in U.S. Appl. No. 10/955,622.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Feb. 21, 2007 in U.S. Appl. No. 11/018,569.
U.S. Official Action mailed Mar. 18, 2008 in U.S. Appl. No. 11/018,569.
U.S. Official Action mailed Jun. 19, 2007 in U.S. Appl. No. 11/018,718.
U.S. Official Action mailed Mar. 21, 2007 in U.S. Appl. No. 11/018,910.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed Mar. 21, 2007 in U.S. Appl. No. 11/019,088.
U.S. Official Action mailed May 8, 2007 in U.S. Appl. No. 11/072,188.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Jun. 18, 2007 in U.S. Appl. No. 11/398,339.
U.S. Official Action mailed Mar. 25, 2008 in U.S. Appl. No. 11/398,339.
European Search Report dated Nov. 3, 2006 in EP 05111509.5.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
Halvorson et al., "Microsoft Office XP Inside Out, 2001", Microsoft Press, pp. 272, 273 and 289.
"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview—Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.

U.S. Official Action mailed Jun. 26, 2008 in U.S. Appl. No. 11/072,659, 12 pgs.
U.S. Official Action mailed Jul. 9, 2008 in U.S. Appl. No. 11/019,088, 31 pgs.
European Search Report dated Mar. 26, 2008 in EP 05111677.0, 5 pgs.
European Search Report dated Apr. 22, 2008 in EP 05111549.1, 11 pgs.
PCT Search Report dated Jun. 25, 2008 in PCT/US2006/21673, 10 pgs.
European Communication dated Jul. 22, 2008 in EP 05111549.1, 8 pgs.
Chinese Office Action dated Aug. 1, 2008 in 200510126792.8, 20 pgs.
Chinese Office Action dated Aug. 1, 2008 in 200510126798.5, 26 pgs.
U.S. Official Action mailed Oct. 3, 2007 in U.S. Appl. No. 11/018,910, 18 pgs.
U.S. Official Action mailed Feb. 4, 2008 in U.S. Appl. No. 11/125,907, 19 pgs.
U.S. Official Action mailed Jul. 22, 2008 in U.S. Appl. No. 11/072,188, 26 pgs.
U.S. Official Action mailed Oct. 30 2008 in U.S. Appl. No. 11/125,907, 18 pgs.
U.S. Official Action mailed Nov. 14, 2008 in U.S. Appl. No. 11/072,659, 29 pgs.
European Search Report dated Nov. 30, 2007 in EP 05105111.8, 3 pgs.
European Examination Report dated Mar. 14, 2008 in EP 05105111.8, 5 pgs.
Chinese Office Action dated Jul. 18, 2008, in 200510126789.6, 31 pgs.
Chinese Office Action dated Aug. 22, 2008 in 200510125059.04, 28pgs.
Chinese Office Action dated Oct. 31, 2008 in 200510125058.X, 15 pgs.
European Search Report dated Dec. 15, 2008 in EP 05111511.1, 7 pgs.
U.S. Official Action mailed Dec. 17, 2008 in U.S. Appl. No. 11/019,088, 37 pgs.
European Search Report dated Dec. 15, 2008 in EP 05111511.1, 7 pgs.
Orchard et al. "[Editorial Draft] Versioning XML Languages W3C Proposed TAG Finding", http://wvvw.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://wvvw.4officeautomation.com/ReplyAssistant, copyright 2002, 4 pp. from download software.
Jones, B., "Word XML's Context Free Chunks: Building a Document from Multiple Pieces of Content", http://blogs.msdn.com/brian_jones_archive/2005/07/20/441167.aspx, Jul. 20, 2005, 4 pp.
Carrano, "Data Abstraction and Problem Solving with C++", copyright 1995, pp. 14-16.
U.S. Official Action mailed Dec. 17, 2008 in U.S. Appl. No. 11/019,088.
U.S. Official Action mailed Jan. 23, 2009 in U.S. Appl. No. 11/389,367.
U.S. Official Action mailed Feb. 4, 2009 in U.S. Appl. No. 11/445,903.
U.S. Official Action mailed Apr. 16, 2009 in U.S. Appl. No. 11/072,188.
PCT Search Report dated Jul. 3, 2007 in PCT/US2006/21825.
European Communication dated Mar. 26, 2008 in EP 05112123.4.
Chinese Office Action dated Aug. 1, 2008 in 200510125062.6.
European Search Report dated Dec. 15, 2008 in EP 05111511.1.
Chinese First Office Action dated Jan. 9, 2009 in 200510127115.8.
Chinese Second Office Action dated Jan. 16, 2009 in 200510125062.6.
Chinese Second Office action dated Feb. 6, 2009 in 200510126789.6.
Chinese First Office Action dated Feb. 6, 2009 in 200510088462.4.
Chinese Second Office Action dated Mar. 6, 2009 in 200510126798.5.

European Search Report dated Mar. 11, 2009 in EP 05111550.9.
European Communication dated Mar. 12, 2009 in EP 05111375.1.
Russian Official Action dated Jan. 13, 2008 in 2412-139543RU/8132, pp. 1-9.
Chinese Second Office Action dated Mar. 13, 2009 in 200480001395.1, pp. 1-7.
Chinese Second Office Action dated Mar. 27, 2009 in 20040001339.08, pp. 1-7.
Chinese Decision on Rejection dated Mar. 27, 2009 in 200480001336.4, pp. 1-17.
Chinese Decision on Rejection dated May 8, 2009 in 200510125059.04, pp. 1-14.
Chinese Third Office Action dated Jun. 5, 2009 in 200510126789.6, pp. 1-7.
Adobe Creative Team, "Adobe Acrobat 5.0 Classroom in a Book", published Jun. 26, 2001, Adobe Press, pp. 1-26+cover page (27 pp.).
European Communication dated Jul. 10, 2009 in EP 05111511.1-1527, pp. 1-5.
Proydakov, E.M., "English-Russian Explanatory Dictionary in Computing Engineering, Internet, and Programming", Moscow: publishing house "Russian edition", 2001, pp. 1-3.
Gudgin, M., "SOAP Version 1.2 Part 1: Messaging Framework", W3C Candidate Recommendation (Dec. 19, 2002), pp. 1-65.
Chinese Second Office Action dated Jun. 5, 2009 in 200480001312.9, pp. 1-9.
Chinese Third Office Action dated Jul. 17, 2009 in 200480001395.01, pp. 1-7.

* cited by examiner

CONTEXT FREE DOCUMENT PORTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to use of the Extensible Markup Language (XML). More particularly, the present invention relates to inserting a portion of XML data into a document outside the context of a document from which the portion is obtained.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well-known strengths including rich editing, formatting, printing, calculation, and on-line and off-line editing.

Methods and systems have been developed for representing entire documents and all associated document properties and objects as an Extensible Markup Language (XML) representation. There are many components that make up such a document such as paragraphs, tables, styles, fonts, lists, and the like. Some components of a document reference other components for providing a first component with structural limitations. For example, a paragraph in a document might reference a particular style setting that would define how the paragraph is to appear in a document. For another example, a paragraph component of a document may be part of a particular list structure in a document. Because there are a number of properties and objects that other objects of a document may reference, such as styles, there is typically a need in a document for a header in which various properties and objects, such as style and font definitions, are located. Accordingly, when a paragraph, for example, references a particular style setting, an application parsing the document will know where to look to find a definition of the style setting referenced by the paragraph.

Unfortunately, a problem occurs when a user attempts to add additional content to a particular document where the additional content contains or references objects and properties such as styles and fonts apart from the objects and properties of the document to which the content is being added. For example, if a user desires to add a couple of paragraphs to an XML-formatted document, where the added paragraphs reference a particular style, it is necessary to determine if the particular style already exists in the document to which the paragraphs are added. If the particular style does exist in the document, it is then necessary to ensure that the style existing in the document contains the same properties as are expected for the added paragraphs. If the style does not exist, it is necessary to insert new style information for the added paragraphs into the header of the document. Either way, rather than simply dealing with the content (paragraphs) being added to the document, the user must deal with the entire document.

It is with respect to these and other considerations that the present invention has been made.

SUMMARY OF THE INVENTION

The present invention solves the above and other problems by providing self-describing portions of text or data in a document. According to an aspect of the invention, portions of a document, such as individual paragraphs or groups of paragraphs or fragments of text, are provided self-describing properties such as style, font, list type, and the like. If such a portion of a document is subsequently copied or moved to a second document or to a different location in the first document, the self-describing properties provided for the portion travel with the portion to the second document or to the different location in the first document. Consequently, an application preparing and displaying the second document or the first document may consume and display the portion according to the properties provided for the portion. Apart from copying or moving text from one document to another, the self-describing properties of the text portion allow users and software applications who desire to or who are required to parse and manipulate a file to apply rich editing to portions of the file or document without having to parse the entire document to manage properties associated with the entire document or file.

According to another aspect of the invention, an Extensible Markup Language (XML) schema is provided for providing an XML representation of specified portions of an XML-formatted document such that each specified portion carries with it its own properties such as styles, list types, fonts, and the like. If one of such specified portions of the document is copied or moved to a different document or is , a consuming application operating the different document need only parse the imported text or data portion to determine specific properties associated with the imported text, such as styles, list types, fonts, etc. Accordingly, the consuming application need not parse the header information for the entire document into which the specified portion is inserted, nor does the consuming application have to determine whether any properties associated with the imported portion conflict with definitions associated with similar or like properties applied to the entire document.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Embodiments of the present invention are directed to methods and systems for inserting a portion of text or data into a document where the inserted portion of text or data carries with it its own specific formatting properties such as specified styles, fonts, list types, and the like. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
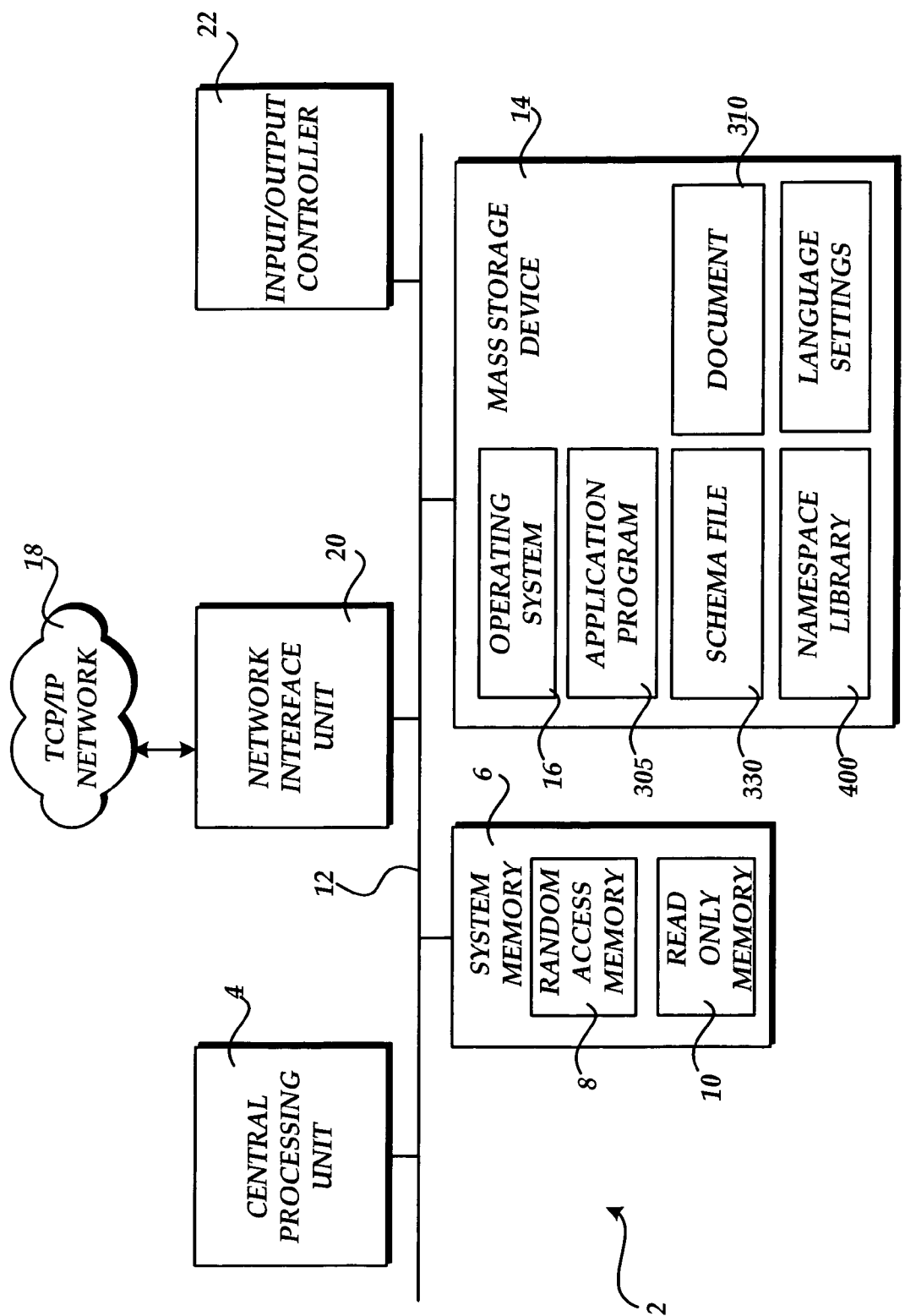
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. A schema file 330 and a namespace/schema library 400, described below, are also shown.

Figure 2:
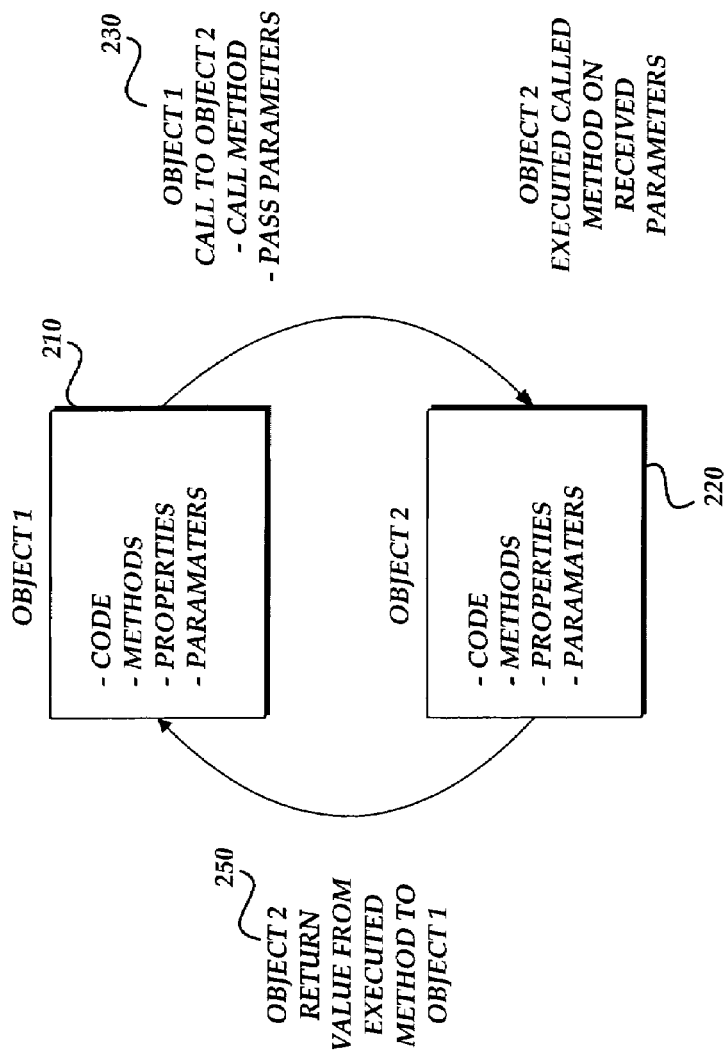
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters.

Similarly, a second object 220 may also include software code, executable methods, properties, and parameters.

A first object 210 may communicate with a second object 220 to obtain information or functionality from the second object 220 by calling the second object 220 via a message call 230. As is well know to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
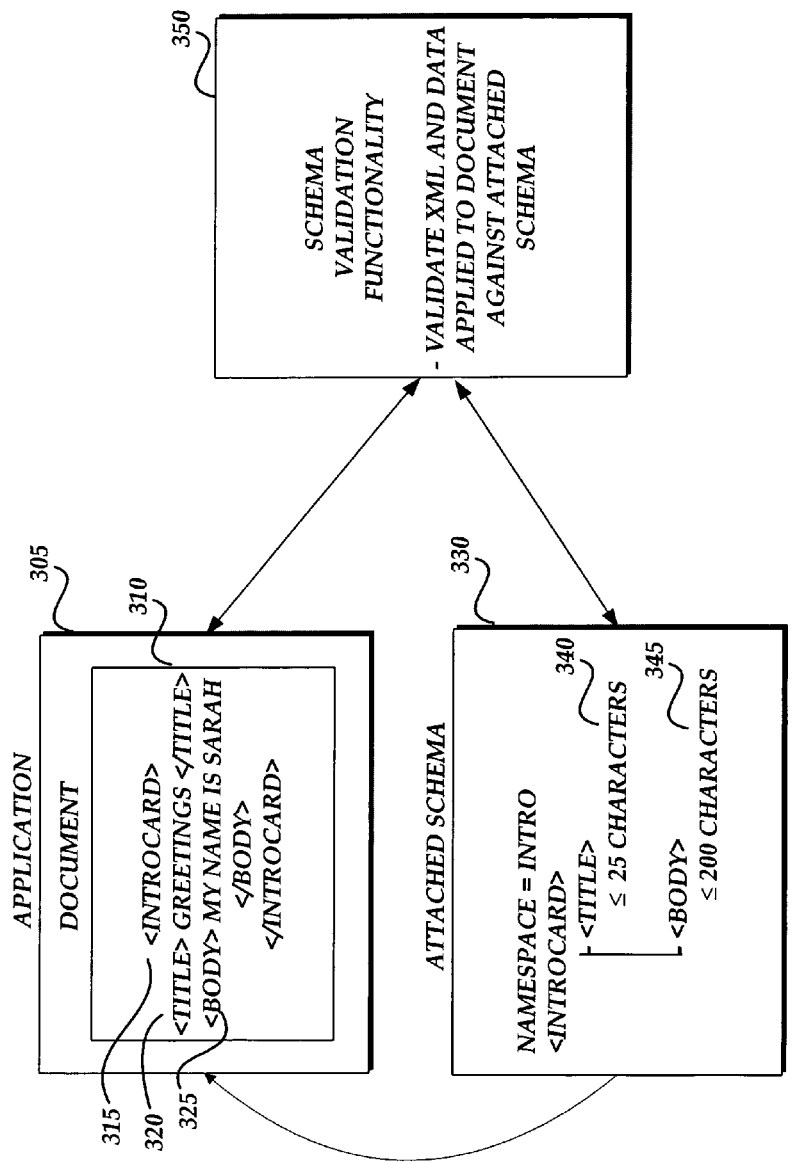
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a Namespace or XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by the Namespace "intro" the schema file includes a root element of <intro card>.

According to the schema file 330, the <intro card> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see US patent application entitled Mechanism for Downloading Software Components from a Remote Source for Use by a Local Software application, U.S. Ser. No. 10/164,260, filed Jun. 5, 2002.

Referring still to FIG. 3, a schema validation functionality module 350 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <intro card>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

Context Free Document Text and Data Portions

Figure 4:
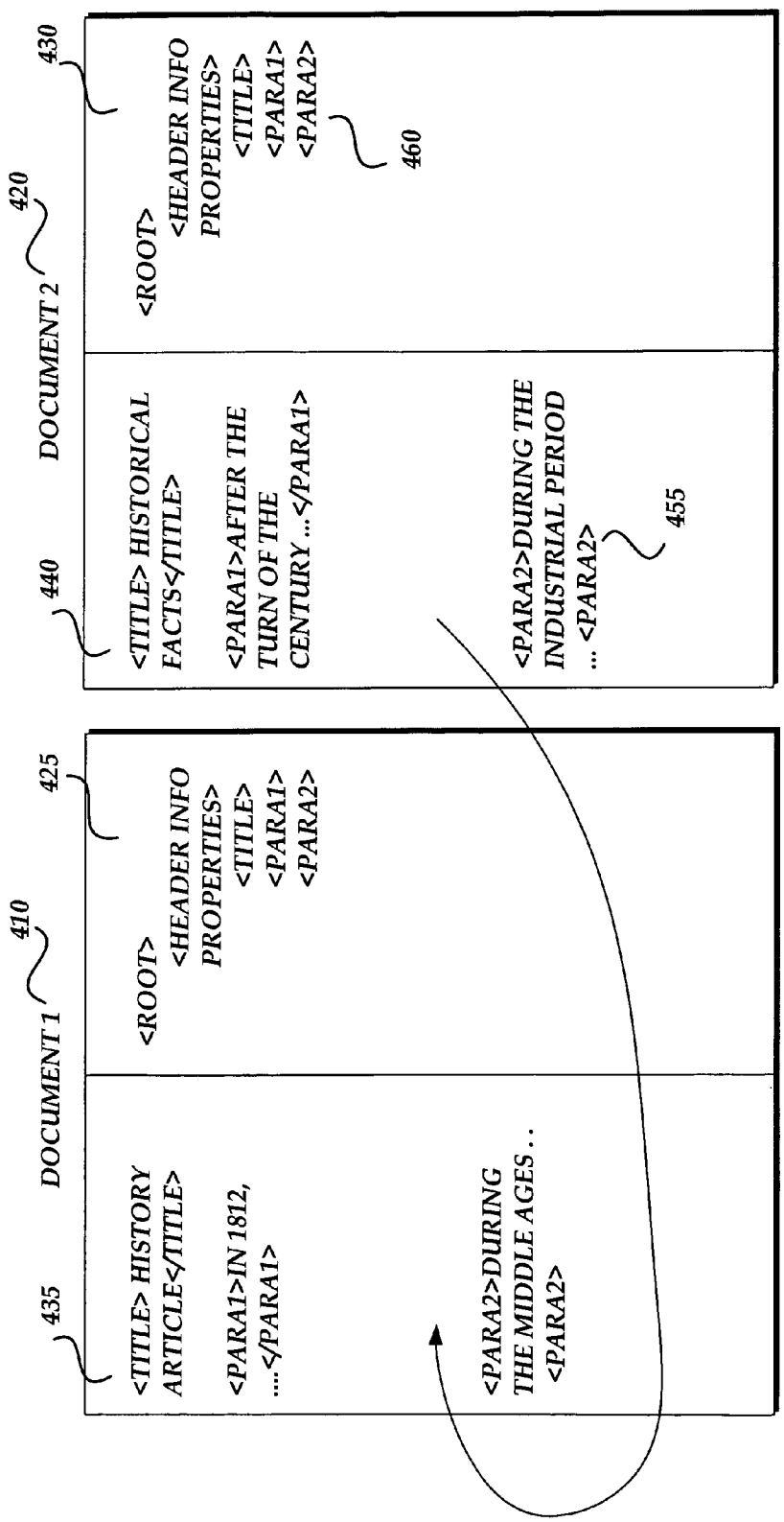
FIG. 4 is a block diagram illustrating interaction between a first document and a second document where a portion of text is copied or moved from the second document to the first document according to embodiments of the present invention.
Figure 5:
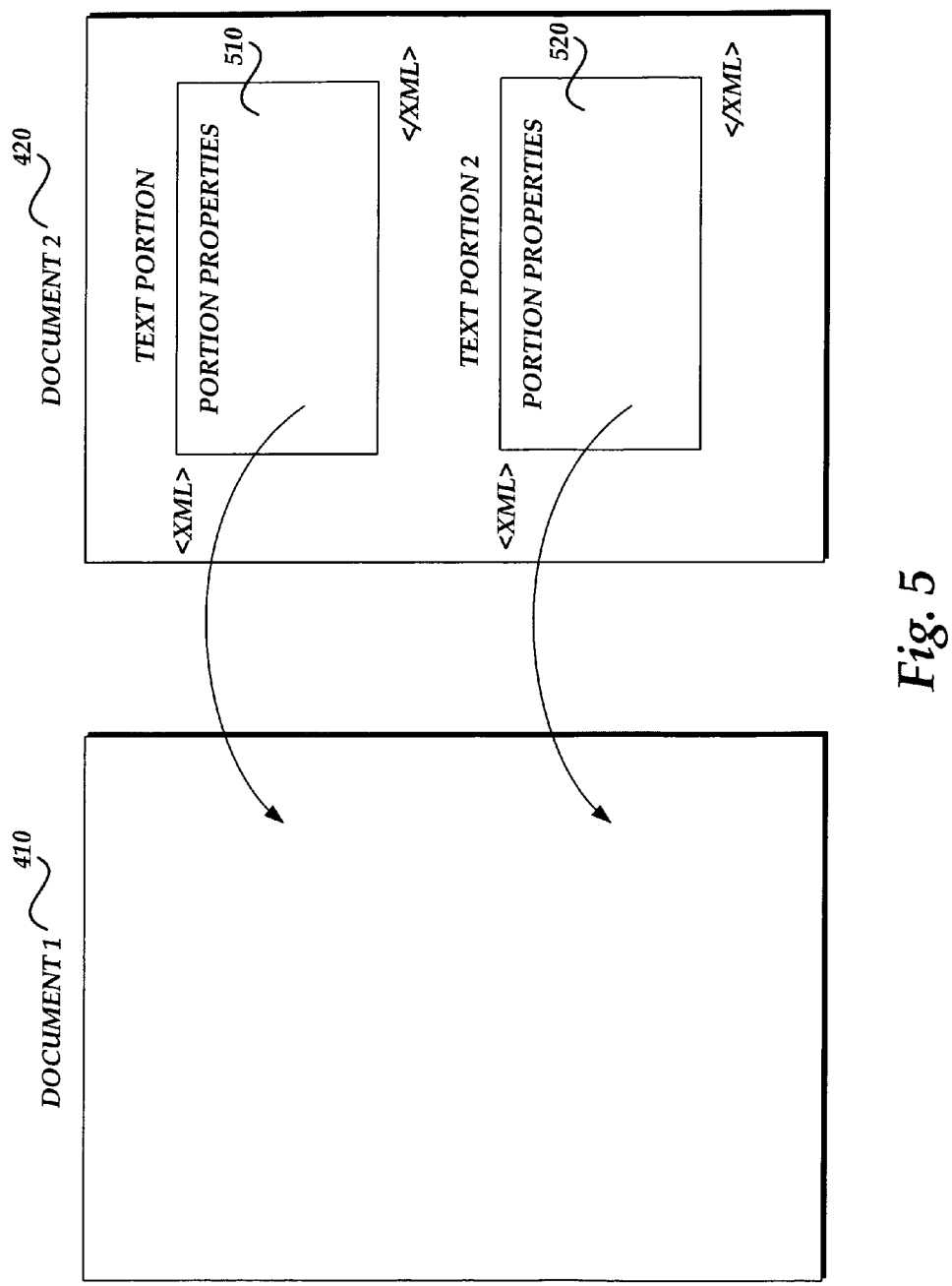
FIG. 5 is a block diagram illustrating interaction between a first document and a second document where a portion of text is copied or moved from the second document to the first document according to embodiments of the present invention.

As briefly described above, embodiments of the present invention provide methods and systems for inserting a portion of text or data into a document where the inserted portion of text or data carries with it its own specific formatting and style properties such as specified styles, fonts, list types, and the like. FIG. 4 is a block diagram illustrating interaction between a first document and a second document where a portion of text is copied or moved from the second document to the first document according to embodiments of the present invention. FIG. 5 is a block diagram illustrating interaction between a first document and a second document where a portion of text is copied or moved from the second document to the first document according to embodiments of the present invention. It should be understood that describing the present invention in terms of copying or moving a text portion from one document to another is by way example only. Apart from copying or moving text from one document to another, the self-describing properties of the text portion allow users and software applications who desire to or who are required to parse and manipulate a file to apply rich editing to portions of the file or document without having to parse the entire document to manage properties associated with the entire document or file.

Referring to FIG. 4, a document 410 and a document 420 are described for purposes of illustrating how a portion of text may be copied from the document 420 into the document 410 according to embodiments of the present invention. The first document 410 has a title and two paragraphs. Also illustrated for the document 410 is an XML structure pane 425 showing Extensible Markup Language (XML) structure applied to the document 435. For example, a <title> element is applied to the title of the document 435, a <paragraph 1> element is applied to the first paragraph of the document 435 and a <paragraph 2> element is applied to the second paragraph of the document 435. The second document 420 includes a document 440 that has been similarly marked up with XML structure. An XML structure pane 430 is illustrated for the document 420.

According to embodiments of the present invention, a text or data portion from the second document may be copied or moved to the first document such that style and other formatting properties are carried with the text or data portion from the one document to another document. Accordingly, there is no need to resolve style or formatting properties associated with the text portion inserted into the first document against style or other formatting properties associated with the first document. For example, as shown in FIG. 4 the first document may have a header information properties element for referencing styles and other formatting properties associated with the first document. That is, the user or creator of the first document may have established a set of styles or formatting properties for the first document. According to prior art systems, as described above, if the user desires to copy the second paragraph 455 from the second document 420 into the first document 410, style or formatting information associated with the second paragraph 455 in the second document 420 may conflict with style or formatting information contained at the document level of the first document 410.

For example, the first document 410 may have a style called "Header 1" causing a formatting of boldface and italics to be applied to the document 435. On the other hand, the creator of the second document 420 may have likewise used the style designator "Header 1" for formatting the second paragraph 455 containing the second document to include boldfacing, but not italics. If the second paragraph 455 of the second document 420 is copied into the first document 410, the style applied to the second document will conflict with the style applied to the document in the first document 410. Therefore, the user of the first document 410 will be required to manually parse the header information properties element of the XML structure applied to the first document 410 in order to make changes to the styles applied to the inserted text or data in order to prevent a conflict of the two styles.

According to embodiments of the present invention, an XML schema is provided for applying style markup as specified text and data portions of a document such as the second paragraph 455 of the second document 420 so that particular styles or formatting applications to a given text or data portion are carried with the text or data portion to the first document. By applying an XML markup to a particular text or data selection, the first document need not de-conflict style or formatting properties applied to inserted text or data portions so long as the first document has access to the style or formatting markup applied to the inserted text or data portion.

Referring to FIG. 5, a text portion 510 and a text portion 520 are illustrated for inserting into the first document 410. According to embodiments of the present invention, each text portion 510 and 520 may be a sentence, a paragraph, multiple paragraphs, fragments of sentences or paragraphs, alphanumeric data, or any other native objects. As should be appreciated, the creator of the second document 420 marks up the second document with Extensible Markup Language data according to the context free text portion schema which defines XML elements, as described below, for specifying particular text or data portions which carries with them their own styles or other formatting properties. In effect, each of the text portions 510 and 520 become "mini" documents carrying their own style and formatting properties that may be inserted into a first document 410 and which may be treated separately from the main document 410 by an XML parsing application operating on the document 410.

It should be understood, a text or data portion such as the second paragraph 455 or either of the text portions 510, 520 illustrated in FIG. 5, may be copied and pasted or cut and pasted from the second document into the first document according to conventional cut/copy and pasting methods available from a variety of software applications. Alternatively, according to a variety of Extensible Markup Language parsing applications, the user may likewise insert a text or data portion from a second document into a first document by selecting an appropriate XML node from the XML structure pane 430 and copying that XML node into the XML structure of the first document. That is, by selecting the <paragraph 2> node 460 from the XML structure 430 of the second document 420 and by moving that node to the XML structure of the first document 410, the XML markup and associated text or data of the second paragraph 455 may be inserted into the first document along with its own style and other formatting properties as described herein.

To further illustrate the operation of embodiments of the present invention, the following XML structure is associated with a simple document having the following two paragraphs.

Para 1: The quick brown fox jumps over the lazy dog.
Para 2: The quick brown fox jumps over the lazy dog.

As can be seen in the following XML structure, a font of "Times New Roman" and a style identification of "Default Paragraph Font" is applied to the two paragraphs. The actual text of the two paragraphs is also illustrated in the following XML structure.

```
<?xml version="1.0" encoding="UTF-8" standalone=
   "yes" ?>
=<w:wordDocument xmlns:w="http://schemas.microsoft.
   com/office/word/2003/wordml" xmlns:wx="http://
   schemas.microsoft.com/office/word/2003/auxHint"
   w:macrosPresent="no" w:embeddedObjPresent="no"
   w:ocxPresent="no" xml:space="preserve">
  =<w:styles>
    <w:versionOfBuiltInStylenames w:val="4" />
    <w:latentStyles w:defLockedState="off" w:latentStyle-
       Count="156" />
  =<w:style w:type="paragraph" w:default="on"
     w:styleId="Normal">
    <w:name w:val="Normal" />
  =<w:rPr>
    <wx:font wx:val="Times New Roman" />
    <w:sz w:val="24" />
    <w:sz-cs w:val="24" />
    <w:lang w:val="EN-US" w:fareast="EN-US"
       w:bidi="AR-SA" />
  </w:rPr>
```

```
</w:style>
=<w:style   w:type="character"   w:default="on"   w:
   styleId="DefaultParagraphFont">
   <w:name w:val="Default Paragraph Font" />
   <w:semiHidden />
</w:style>
=<w:style       w:type="list"       w:default="on"
   w:styleId="NoList">
   <w:name w:val="No List" />
   <w:semiHidden />
</w:style>
</w:styles>
=<w:body>
   <w:p>
      =<w:r>
         <w:t>The quick brown fox jumps over the lazy dog.</
            w:t>
      </w:r>
   </w:p>
=<w:p>
      =<w:r>
         <w:t>The quick brown fox jumps over the lazy dog.</
            w:t>
      </w:r>
</w:p>
<w:p />
</w:body>
</w:wordDocument>
```

According to embodiments of the present invention, consider for example that the user would like to insert a third paragraph into the document as follows "The quick brown fox jumps over the lazy dog" so that the inserted paragraph provides a final document as follows.

Para 1: The quick brown fox jumps over the lazy dog.
Para 2: The quick brown fox jumps over the lazy dog.
Para 3: The quick brown fox jumps over the lazy dog.

The following is an example XML structure showing the first two paragraphs of the document with the normal default style applied to them. According to this example, as shown in the following XML structure, the user inserts the third italicized paragraph into the document under a style called "My Style." Because the paragraph is being inserted in an environment outside of the native Word Processing application, the logic of checking that the "My Style" style exists must be done manually. The XML file must be parsed to find the proper location of the style declarations, and then the style declarations must be parsed to guarantee that there is no conflict. Once this has been done, the "My Style" declaration can be entered. Now that the "My Style" declaration is entered, then the XML file must be parsed again to find the proper location for the paragraph itself. Since there was no conflict with the "My Style" declaration, the paragraph being inserted can still reference the "My Style" style. Otherwise, the paragraph itself would have to be altered to reference the proper style.

```
<?xml  version="1.0"  encoding="UTF-8"  standalone=
   "yes" ?>
<?mso-application progid="Word.Document"?>
=<w:wordDocument   xmlns:w="http://schemas.microsoft.
   com/office/word/2003/wordml"       xmlns:wx="http://
   schemas.microsoft.com/office/word/2003/auxHint"
   w:macrosPresent="no"    w:embeddedObjPresent="no"
   w:ocxPresent="no" xml:space="preserve">
   =<w:styles>
      <w: versionOfBuiltInStylenames w:val="4" />
      <w:latentStyles w:defLockedState="off" w:latentStyle-
         Count="156" />
      =<w:style      w:type="paragraph"       w:default="on"
         w:styleId="Normal">
         <w:name w:val="Normal" />
         =<w:rPr>
            <wx:font wx:val="Times New Roman" />
            <w:sz w:val="24" />
            <w:sz-cs w:val="24" />
            <w:lang    w:val="EN-US"    w:fareast="EN-US"
               w:bidi="AR-SA" />
         </w:rPr>
      </w: style>
      =<w:style      w:type="character"      w:default="on"
         w:styleId="DefaultParagraphFont">
         <w:name w:val="Default Paragraph Font" />
         <w:semiHidden />
      </w:style>
      =<w:style       w:type="table"       w:default="on"
         w:styleId="TableNormal">
         <w:name w:val="Normal Table" />
         <wx:uiName wx:val="Table Normal" />
         <w:semiHidden />
         =<w:rPr>
            <wx:font wx:val="Times New Roman" />
         </w:rPr>
         =<w:tblPr>
            <w:tblInd w:w="0" w:type="dxa" />
            =<w:tblCellMar>
               <w:top w:w="0" w:type="dxa" />
               <w:left w:w="108" w:type="dxa" />
               <w:bottom w:w="0" w:type="dxa" />
               <w:right w:w="108" w:type="dxa" />
            </w:tblCellMar>
         </w:tblPr>
      </w:style>
      =<w:style w:type="paragraph" w:styleId="myStyle">
         <w:name w:val="myStyle" />
         <w:basedOn w:val="Normal" />
         <w:rsid w:val="000874C3" />
         =<w:pPr>
            <w:pStyle w:val="myStyle" />
         </w:pPr>
         =<w:rPr>
            <wx:font wx:val="Times New Roman" />
            <w:color w:val="FF0000" />
         </w:rPr>
      </w:style>
      =<w:style      w:type="list"      w:default="on"
         w:styleId="NoList">
         <w:name w:val="No List" />
         <w:semiHidden />
      </w:style>
   </w:styles>
   =<w:body>
      =<w:p>
         =<w:r>
            <w:t>The quick brown fox jumps over the lazy dog.</
               w:t>
         </w:r>
      </w:p>
      =<w:p>
         =<w:r>
            <w:t>The quick brown fox jumps over the lazy dog.</
               w:t>
         </w:r>
      </w:p>
      =<w:p>
         =<w:pPr>
```

```
    <w:pStyle w:val="myStyle" />
  </w:pPr>
=<w:r>
    <w:t>The quick brown fox jumps over the lazy dog.</w:t>
  </w:r>
</w:p>
<w:p />
</w:body>
</w:wordDocument>
```

As described above, according to embodiments of the present invention, an XML schema is provided which provides an XML element that may be used to markup and describe a particular text or data portion of a document such that style or other formatting properties applied to that text or data portion are treated separately from the remaining style or formatting properties associated with a document into which the text or data portion is inserted. So long as the document into which the text or data portion is inserted is operated by an application that may understand the XML schema associated with the text or data portion inserted into the document, the XML element wrapping the inserted text or data portion will be understood.

Below is a sample XML structure showing the addition of the third italicized paragraph "The quick brown fox jumps over the lazy dog" according to embodiments of the present invention. As shown in the following XML structure, the first two paragraphs are included in the document having style identification of "Times New Roman" and "Default Paragraph Font." However, as shown in the following XML structure, the third paragraph being inserted into the document has been wrapped in an XML element called <cfChunk>. As should be appreciated, the element <cfChunk> is illustrative of an infinite number of names that could be provided to the element according to embodiments of the present invention by the creator of this particular XML structure. As should be understood, the element might similarly be called context free portion, CFportion, context free data, CFdata, and the like. Inside the element <cfChunk> is contained the third paragraph "The quick brown fox jumps over the lazy dog" having a style identification of "My Style" and having a font identification of "italics."

According to embodiments of the present invention, when the third paragraph "The quick brown fox jumps over the lazy dog" is copied or moved from a second document into a first document, the text or data portion moved points to or references an XML schema file that provides an XML parsing application associated with the first document access to the grammatical and other definitional rules associated with XML elements according to the schema file including the <cfChunk> element utilized for wrapping a text or data portion and for carrying with the text or data portion its own individual styles or other formatting properties. Accordingly, when the first document's XML parsing application encounters the element <cfChunk> that application may refer to the associated XML schema to learn that the style and other formatting designations contained in the structure wrapped inside the <cfChunk> element is to be treated particularly for a text or data portion being inserted into the first document and being associated with the <cfChunk> element. Accordingly, when the third paragraph is inserted into the first document according to embodiments of the present invention, as illustrated in the following sample XML structure, the style and other formatting properties associated with that text portion are honored by the application receiving the inserted text or data portion without regard to potentially conflicting style or other formatting properties associated with the document into which the text portion is inserted. The application does the necessary work to resolve any conflicts, and to properly associate the style reference for the paragraph with the appropriate style.

```
<?xml version="1.0" encoding="UTF-8" standalone="yes" ?>
<w:wordDocument xmlns:w="http://schemas.microsoft.com/office/word/2003/wordml" xmlns:wx="http://schemas.microsoft.com/office/word/2003/auxHint" w:macrosPresent="no" w:embeddedObjPresent="no" w:ocxPresent="no" xml:space="preserve">
  <w:styles>
    <w:versionOfBuiltInStylenames w:val="4"/>
    <w:latentStyles w:defLockedState="off" w:latentStyleCount="156" />
=<w:style w:type="paragraph" w:default="on" w:styleId="Normal">
    <w:name w:val="Normal" />
=<w:rPr>
    <wx:font wx:val="Times New Roman" />
    <w:sz w:val="24" />
    <w:sz-cs w:val="24" />
      <w:lang w:val="EN-US" w:fareast="EN-US" w:bidi="AR-SA" />
    </w:rPr>
  </w:style>
=<w:style w:type="character" w:default="on" w:styleId="DefaultParagraphFont">
    <w:name w:val="Default Paragraph Font" />
    <w:semiHidden />
</w:style>
=<w:style w:type="list" w:default="on" w:styleId="NoList">
    <w:name w:val="No List" />
    <w:semiHidden />
</w:style>
=<w:style w:type="table" w:default="on" w:styleId="TableNormal">
    <w:name w:val="Normal Table" />
    <wx:uiName wx:val="Table Normal" />
    <w:semiHidden />
=<w:rPr>
    <wx:font wx:val="Times New Roman" />
</w:rPr>
=<w:tblPr>
    <w:tblInd w:w="0" w:type="dxa" />
=<w:tblCellMar>
    <w:top w:w="0" w:type="dxa" />
    <w:left w:w="108" w:type="dxa" />
    <w:bottom w:w="0" w:type="dxa" />
    <w:right w:w="108" w:type="dxa" />
</w:tblCellMar>
</w:tblPr>
</w:style>
</w:styles>
=<w:body>
  =<w:p>
    =<w:r>
      <w:t>The quick brown fox jumps over the lazy dog.</w:t>
    </w:r>
  </w:p>
  =<w:p>
    =<w:r>
      <w:t>The quick brown fox jumps over the lazy dog.</w:t>
    </w:r>
  </w:p>
```

```
=<w:cfChunk>
    <w:styles>
        <w:style w:type="paragraph" w: styled="myStyle">
            <w:name w:val="myStyle" />
            <w:basedOn w:val="Normal" />
            <w:rsid w:val="000874C3" />
            =<w:pPr>
                <w:pStyle w:val="myStyle" />
            </w:pPr>
            =<w:rPr>
                <wx:font wx:val="Italics" />
                <w:color w:val="FF0000" />
            </w:rPr>
        </w:style>
    </w:styles>
    =<w:pPr>
        <w:pStyle w:val="myStyle" />
    </w:pPr>
    =<w:r>
        <w:t>The quick brown fox jumps over the lazy dog.</w:t>
    </w:r>
    </w:p>
</w:cfChunk>
<w:p />
</w:body>
</w:wordDocument>
```

As described herein, self-describing portions of text or data are provided for inserting into a document whereby an Extensible Markup Language schema is provided for describing XML markup that may be applied to a text or data portion to allow particular style or other formatting properties applied to the text or data portion to travel with the text or data portion to a different document or to a different location in a same document. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method of formatting a selection of text from a document as an Extensible Markup Language (XML) formatted selection such that the selection of text carries formatting properties particular to the selection of text for use in another document, comprising:

receiving the selection of text in the document;

identifying an XML markup specifying one or more formatting properties associated with the selection of text;

applying the XML markup to the selection of text, wherein applying the XML markup to the selection of text includes applying an XML tag to the selection of text;

associating the XML markup with the selection of text for designating that the selection of text is formatted according to the XML markup independent of an other XML markup associated with the other document into which the selection of text is inserted;

inserting the selection of text into the other document by:

receiving the selection of an XML node associated with the selection of text from an XML structure pane, the XML structure pane showing a markup language structure applied to the document, the markup language structure comprising a plurality of markup language nodes associated with portions of text in the document; and in response to a user input, moving the XML node to an XML structure pane showing a markup language structure applied to the other document to insert the XML markup and the selected text into the other document along with style and formatting properties defined in the markup language structure;

parsing the other document for formatting properties required for the other document after inserting the selection of text into the other document;

avoiding a conflict between the XML markup associated with the selection of text and the other XML markup associated with the other document by causing the XML markup associated with the selection of text to be carried with the selection of text when the selection of text is inserted into the other document to maintain the application of the XML markup data to the selection of text in the other document independent of the other XML markup associated with the other document; and providing a framework for an annotation of the XML markup by associating the selection of text with at least one XML schema file attached to the document, the at least one schema file providing a definition of the XML markup applied to the selection of text and providing XML parsing application rules for understanding and using the XML tag.

2. The method of claim 1, further comprising recognizing the XML markup applied to the selection of text upon encountering the XML markup applied to the selection of text in the other document.

3. The method of claim 2, further comprising:

applying the XML Markup applied to the selection of text in the document to the selection of text in the other document; and formatting the other document whereby the XML markup applied to the selection of text in the document is applied to the selection of text in the other document apart from the other XML markup applied to any other text contained in the other document.

4. The method of claim 1, whereby parsing the other document for formatting properties required for the other document after inserting the selection of text into the other document includes parsing formatting properties applied to the other document including parsing the XML markup applied to the selection of text for designating that the selection of text is formatted according to the XML markup.

5. The method of claim 4, further comprising parsing the other document with an XML parsing application capable of understanding the other XML markup applied to the other document and capable of understanding the XML markup applied to the selection of text for designating that the selection of text is formatted according to the data applied to the selection of text in the document.

6. The method of claim 5, whereby the XML tag may be recognized by the XML parsing application as designating that the selection of text is formatted according to the data applied to the selection of text in the document apart from the other XML markup applied to other portions of text in the other document into which the selection of text is inserted.

7. The method of claim 6, whereby during parsing the other document for the XML markup to applied to the selection of text for designating that the selection of text is formatted according to the XML markup applied to the selection text in the document, locating the XML tag applied to the selection of text for designating that the selection of text is formatted according to the XML markup applied to the selection of text in the document.

8. The method of claim 7, whereby the XML tag is a <cfChunk> tag.

9. The method of claim 1 further comprising:
  validating the XML markup and the associated selection of text against the at least one XML schema file as the XML markup and the associated selection of text is entered into the document; and
  generating an error message to alert a user of at least one of an invalid XML markup and an invalid text string.

10. A method of formatting a selection of text from a document as an Extensible Markup Language (XML) formatted selection such that the selection of text carries formatting data particular to the selection of text for use in an other XML document:
  receiving the of text in the document;
  applying formatting data particular to the selection of text;
  applying an XML tag to the selection of text whereby the XML tag may be recognized by an XML parsing application as designating that the selection of text is formatted according to the particular formatting data apart from any formatting applied to other portions of text, wherein the XML tag is a <cfChunk> tag;
  inserting the selection of text into the other XML document by:
    receiving the selection of an XML node associated with the selection of text from an XML structure pane, the XML structure pane showing a markup language structure applied to the document, the markup language structure comprising a plurality of markup language nodes associated with portions of text in the document; and
    in response to a user input, moving the XML node to an XML structure pane showing a markup language structure applied to the other XML document to insert the XML markup and the selected text into the other XML document along with style and formatting properties defined in the markup language structure;
  parsing the other XML document for other formatting data required for the other XML document;
  determining the formatting data particular to the selection of text upon encountering the XML tag applied to the selection of text;
  applying the formatting data particular to the selection of text to the selection of text in the other XML document;
  formatting the other XML document whereby the formatting data particular to the selection of text is applied to the selection of text in the other XML document apart from any formatting applied to any other text contained in the other XML document; and
  providing a framework for an annotation of the XML markup by further comprising associating the selection of text with an XML schema file attached to the document, the schema file providing a definition of the XML tag applied to the selection of text and providing XML parsing application rules for understanding and using the XML tag.

11. A computer storage medium on which is stored instructions which when executed by a computer perform a method of representing a selection of text from a document as an Extensible Markup Language (XML) formatted selection such that the selection of text carries formatting data particular to the selection of text for use in a subsequent XML document:
  receiving the selection of text in the document;
  identifying an XML markup specifying the formatting data particular to the selection of text;
  applying the XML markup the selection of text, wherein applying the XML markup to the selection of text includes applying an XML tag to the selection of text;
  associating the XML markup with the selection of text for designating that the selection of text is formatted according to the XML markup independent of an other XML markup associated with the subsequent XML document into which the selection of text is inserted;
  inserting the selection of text into the subsequent XML document by:
    receiving the selection of an XML node associated with the selection of text from an XML structure pane, the XML structure pane showing a markup language structure applied to the document, the markup language structure comprising a plurality of markup language nodes associated with portions of text in the document; and
    in response to a user input moving the XML node to an XML structure pane showing a markup language structure applied to the subsequent XML document to insert the XML markup and the selected text into the subsequent XML document along with style and formatting properties defined in the markup language structure;
  parsing the other document for formatting properties required for the other document after inserting the selection of text into the other document;
  avoiding a conflict between the XML markup and the other XML markup by maintaining the association of the XML markup with the selection of text independent of the other XML markup associated with the other document; and
  providing a framework for the annotation of the XML markup by associating the selection of text with an XML schema file attached to the document, the schema file providing a definition of the XML tag applied to the selection of text and providing XML parsing application rules for understanding and using the XML tag.

12. The computer medium of claim 11, further comprising:
  determining the formatting data applied to the selection of text in the document upon encountering the XML markup applied to the selection of text;
  applying the formatting data applied to the selection of text in the document to the selection of text in the subsequent XML document; and
  formatting the subsequent XML document whereby the formatting data applied to the selection of text in the document is applied to the selection of text in the subsequent XML document apart from any formatting applied to any other text contained in the subsequent XML document.

13. The computer medium of claim 12, whereby parsing the subsequent XML document for formatting required for the subsequent XML document after inserting the selection of text into the subsequent XML document includes parsing an other XML markup applied to the subsequent XML document including parsing the XML markup applied to the selection of text for designating that the selection of text is formatted according to the formatting data.

14. The computer medium of claim 13, further comprising parsing the subsequent XML document with an XML parsing application capable of understanding the other XML markup applied to the subsequent XML document and capable of understanding the XML markup applied to the selection of text for designating that the selection of text is formatted according to the formatting data applied to the selection of text in the document.

15. The computer medium of claim 14, whereby the XML tag may be recognized by an XML parsing application as designating that the selection of text is formatted according to the formatting data applied to the selection of text in the document apart from any formatting applied to other portions of text in the document and any other document into which the portion of text is inserted.

16. The computer medium of claim 15, whereby during parsing the subsequent XML document for the XML markup to applied to the selection of text for designating that the selection of text is formatted according to the formatting data applied to the selection text in the document, locating the XML tag applied to the selection of text for designating that the selection of text is formatted according to the formatting data applied to the selection of text in the document.

17. The computer-readable medium of claim 11 further comprising:
- validating the XML markup and the associated selection of text against the XML schema file as the XML markup and the associated selection of text is entered into the document; and
- generating an error message to alert a user of at least one of an invalid XML markup and an invalid text string.

* * * * *